(12) United States Patent
Shih

(10) Patent No.: US 6,285,144 B1
(45) Date of Patent: Sep. 4, 2001

(54) DRIVE UNIT OF A FOOT MASSAGE MACHINE

(76) Inventor: Chao-Ming Shih, No. 29, Lane 335, Yang Hsin Road, Sec. 3, Yung Mei Town, Taoyuan Hsien (TW)

( * ) Notice: Subject to any disclaimer, the term of this patent is extended or adjusted under 35 U.S.C. 154(b) by 0 days.

(21) Appl. No.: 09/702,614

(22) Filed: Nov. 1, 2000

(51) Int. Cl.$^7$ ....................................................... H02K 7/10
(52) U.S. Cl. ................................................. 318/15; 601/23
(58) Field of Search ..................................... 318/3–15, 34, 318/254; 601/23, 26, 27, 28, 29, 30, 31, 32, 57

(56) References Cited

U.S. PATENT DOCUMENTS

| | | | |
|---|---|---|---|
| 4,535,760 | * 8/1985 | Ikeda et al. ............................. | 601/57 |
| 5,107,822 | * 4/1992 | Ohashi .................................... | 601/23 |
| 5,767,634 | * 6/1998 | Taylor et al. ........................... | 318/34 |

* cited by examiner

Primary Examiner—Khanh Dang
(74) Attorney, Agent, or Firm—Rosenberg, Klein & Lee

(57) ABSTRACT

The present invention relates to a drive unit of a foot massage machine which includes a housing in which a motor is installed for bringing an eccentric block into motion to drive a slider assembly at two shaft rods for a lateral shift leftwards and rightwards. The present invention is characterized in that the slider assembly is provided with a longitudinal bar at center thereof, and a crank is inserted on the outer rim of the longitudinal bar. The crank is T-shaped and includes a circular sleeve externally mounted on the longitudinal bar and a cylindrical slider serving as shaft and fixed at one side of the circular sleeve. The cylindrical slider is inserted into a mounting hole of the eccentric block, showing a sliding joint between a shaft and the mounting hole. When the eccentric block rotates with the power output shaft, the crank acts as a driven part and the circular sleeve moves upward and downward in the longitudinal bar. Meanwhile, the driven slider assembly laterally shifts leftward and rightward on two shaft rods by means of the principle of the eccentric drive.

1 Claim, 9 Drawing Sheets

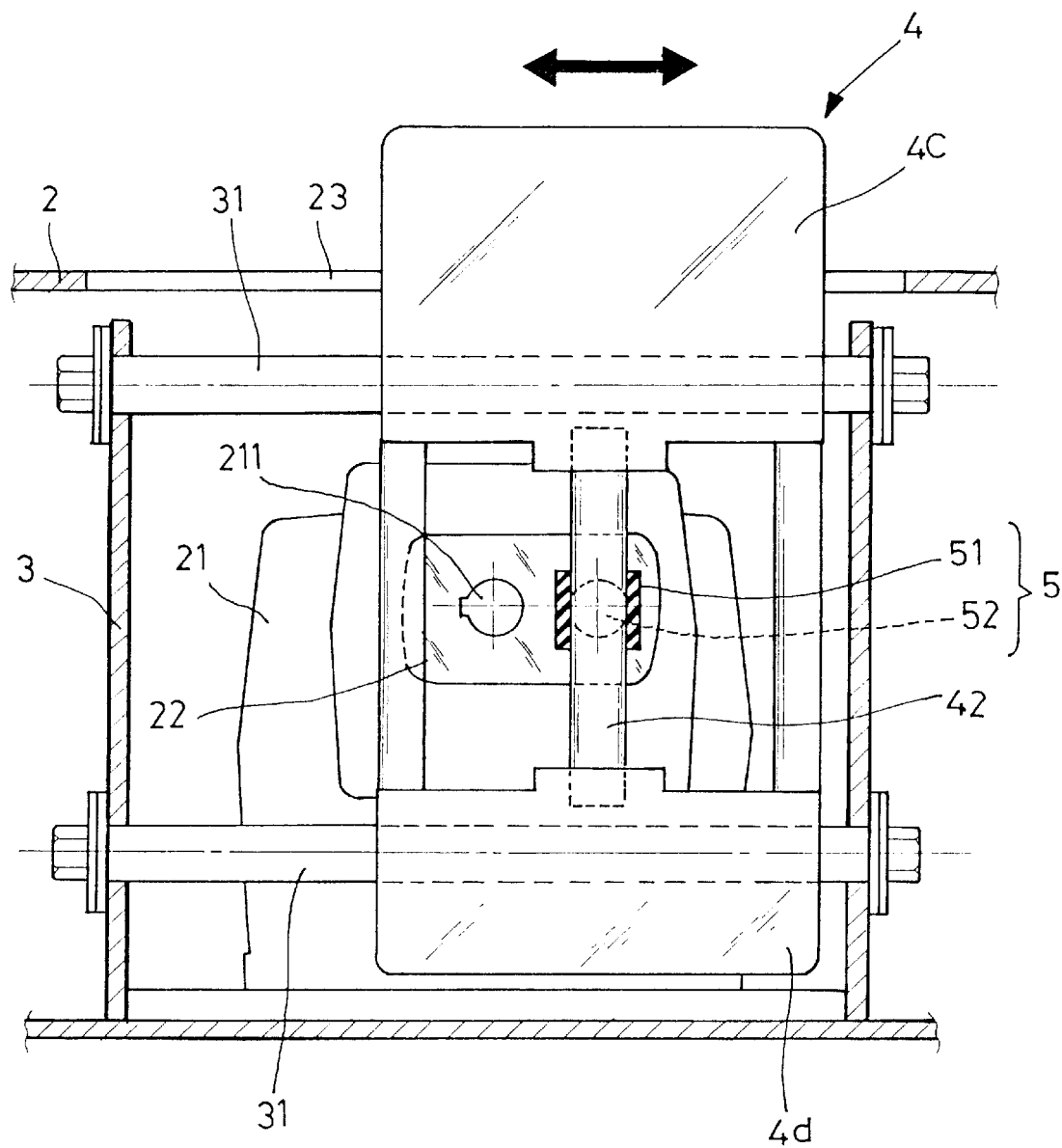
F I G. 9

DRIVE UNIT OF A FOOT MASSAGE MACHINE

BACKGROUND OF THE INVENTION

1. Field of the Invention

The present invention relates to a foot massage machine, and more particularly, to a drive unit thereof.

2. Description of the Prior Art

The so-called foot massage machine 1, as shown in FIG. 1, includes a laterally shiftable massage seat 12 at top of a housing 11. The massage seat 12, as shown in FIGS. 2 and 3, is driven by a slider assembly 13 inside of the housing 11. The slider assembly 13 brought into rotation by means that an eccentric block 15 is driven by a motor 14. In addition, a pulley 151 is mounted at outer side of the eccentric block 15 for engaging into a longitudinal groove 131. As a result, the pulley 151 is movable upward and downward in the longitudinal groove 131 when it rotates. Meanwhile, the slider assembly 13 is driven to move rightward and leftward on two shaft rods 161 at top and bottom of a frame body 16. Thus, the function to massage the feet is achieved. This kind of this design is disclosed in U.S. Pat. No. 5,107,822, TW Patent No.: 145682, 285036, 251457, etc. Though the conventional drive unit of the foot massage machine is simple in configuration, it has the following drawbacks:

1. It's not an optimal state for the mechanical design in making use of the pulley 151 sliding in the longitudinal groove 131 of the slider assembly 13. The reason lies in that the sliding element directly rubs rather than moving the driven body. Moreover, most of the slider assembly 13 is made by plastic injection molding for adapting to the production's needs. In order that the pulley 151 can be movable upward and downward in the longitudinal groove 131 made from plastic and the slider assembly 13 is driven by the revolving force, the contact of the pulley 151 with the longitudinal groove 131 can't be too close. Otherwise, the friction will be too large for moving the slider assembly 13. However, a clearance between two moving elements will produce noise. Especially, the inner wall of the longitudinal groove 131 will be rubbed when the pulley 151 repetitively moves thereon. As a result, the noise becomes bigger and the service life is therefore reduced.

2. The longitudinal groove 131 slides on the shaft rods 161 by means of two shaft grooves 132 thereof so that the above-mentioned drawback will also be created. The closer the contact between two shaft grooves 132 and the shaft rods 161 is, the larger the drive force of the motor 14 will be and the more the electricity is consumed, or even the motor 14 is burnt down due to the overload. If a clearance between the shaft grooves 132 and the shaft rods 161 is present, the slider assembly 13 will easily shake during the rightward or leftward shift while the noise is great.

Accordingly, the foot massage machine configured with the above-mentioned structure has drawbacks of short service life and great noise except its cheap price.

In order to remove the above-mentioned drawbacks, another drive slider assembly (see FIG. 4) is developed. A motor 14 brings an eccentric block 15 in motion which moves a connecting rod 17 connected with the slider assembly 13 so that the slider assembly 13 can be shifted rightward and leftward on the shaft rods 161. This kind of design is disclosed in TW 226097, 217532, etc. This design can remove the above-mentioned drawbacks of directly rubbing the longitudinal groove 131 by the pulley 151; however, the connecting rod 17 can't be too short in order that the slider assembly 13 effectively performs a rightward and leftward displacement. Thus, the motor 14 has to be installed at one side of the frame body 16 rather than at the center of the above-mentioned structure. Accordingly, the center of gravity lies more at one side of the motor 14 in addition to occupying more space. Besides, the rightward and leftward shift of the slider assembly 13 on the shaft rods 161 also has the rubbing problem of the above-mentioned embodiment so that the great noise and the short service life are its drawbacks.

SUMMARY OF THE INVENTION

It is a primary object of the present invention to provide a drive unit of a foot massage machine which has an unique configuration to reach an effect of smooth sliding and little noise.

It is another object of the present invention to provide a drive unit of a foot massage machine which can reach the effect of lowering abrasion and prolonging the service life thereof.

BRIEF DESCRIPTION OF THE DRAWINGS

The accomplishment of this and other objects of the invention will become apparent from the following description and its accompanying drawings of which:

FIG. 9 is a schematic drawing of another applicable embodiment of the slider assembly of the present invention.

DETAILED DESCRIPTION OF THE PREFERRED EMBODIMENT

Figure 1:
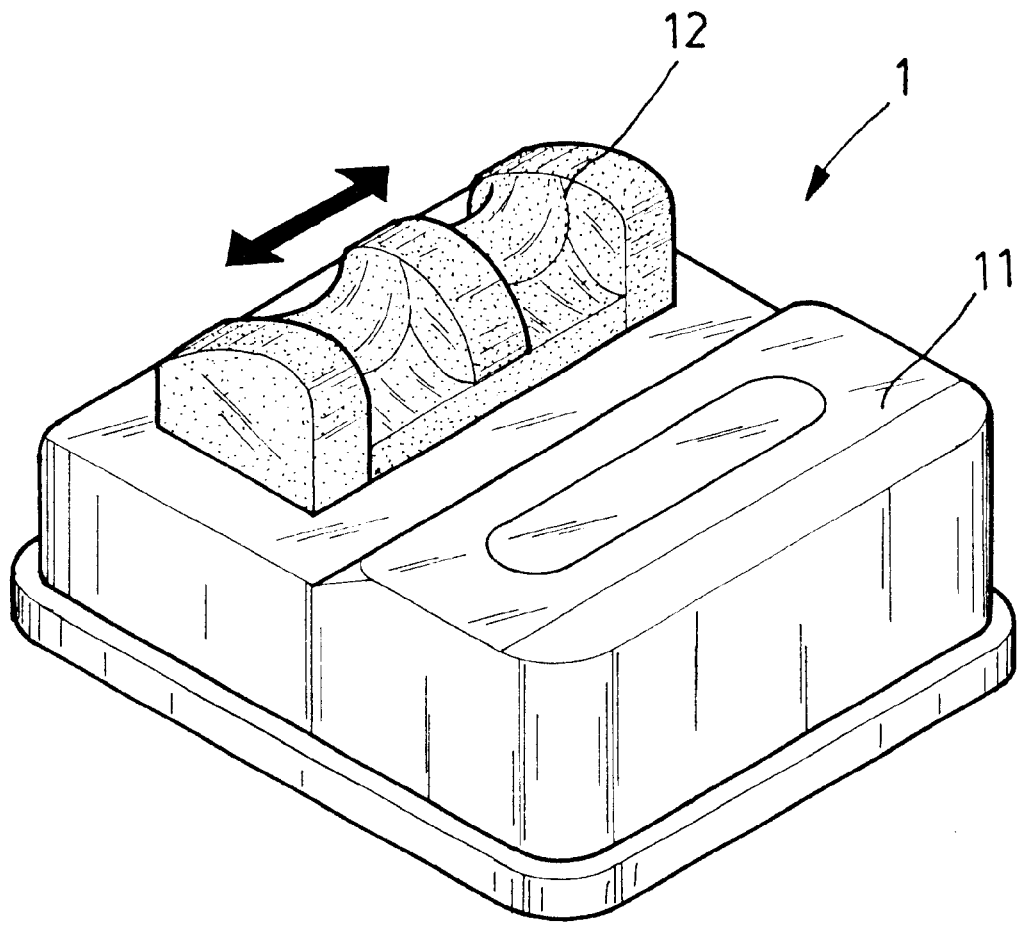
FIG. 1 is a perspective view of a conventional foot massage machine.
Figure 2:
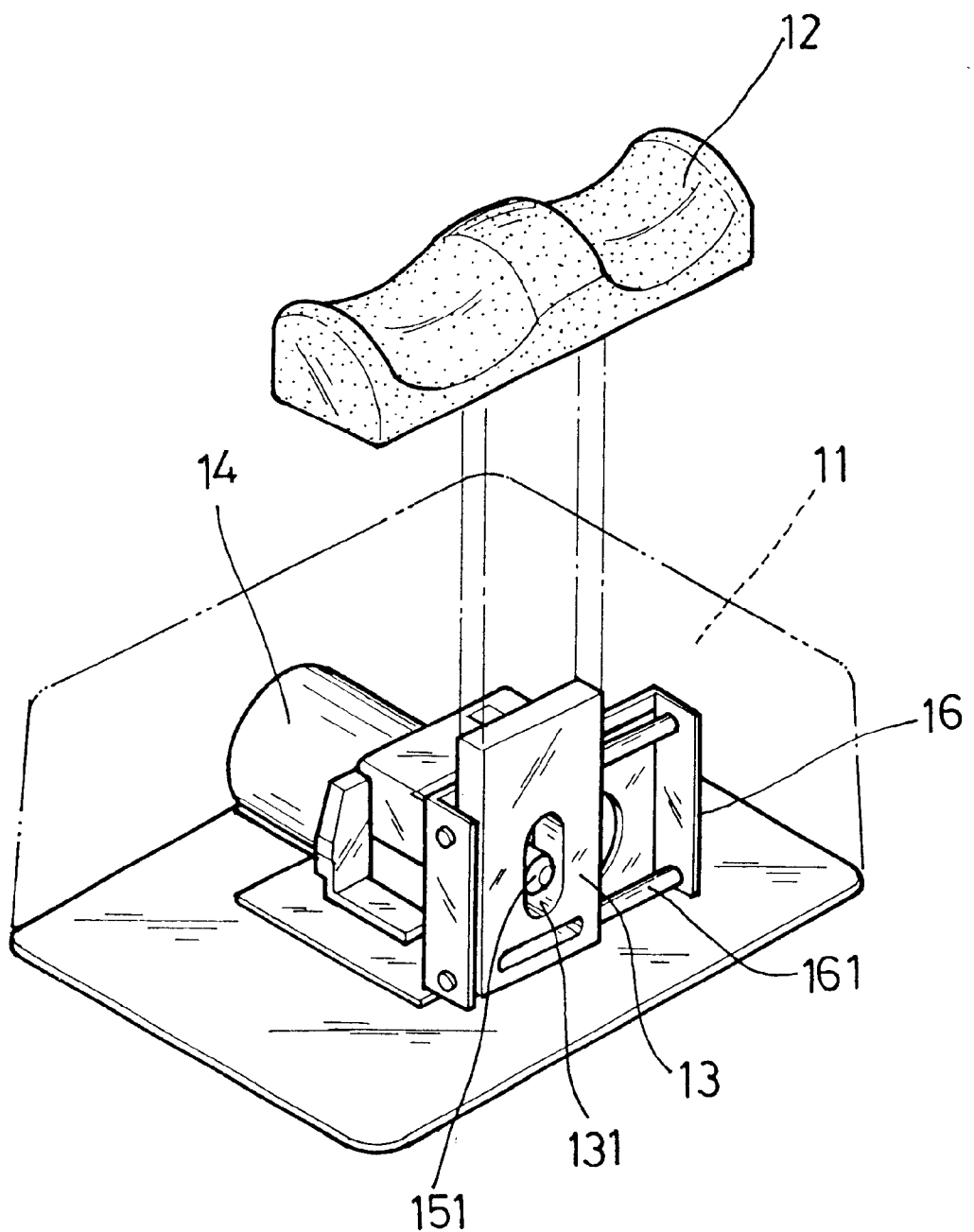
FIG. 2 is a perspective exploded view of the conventional foot massage machine.
Figure 3:
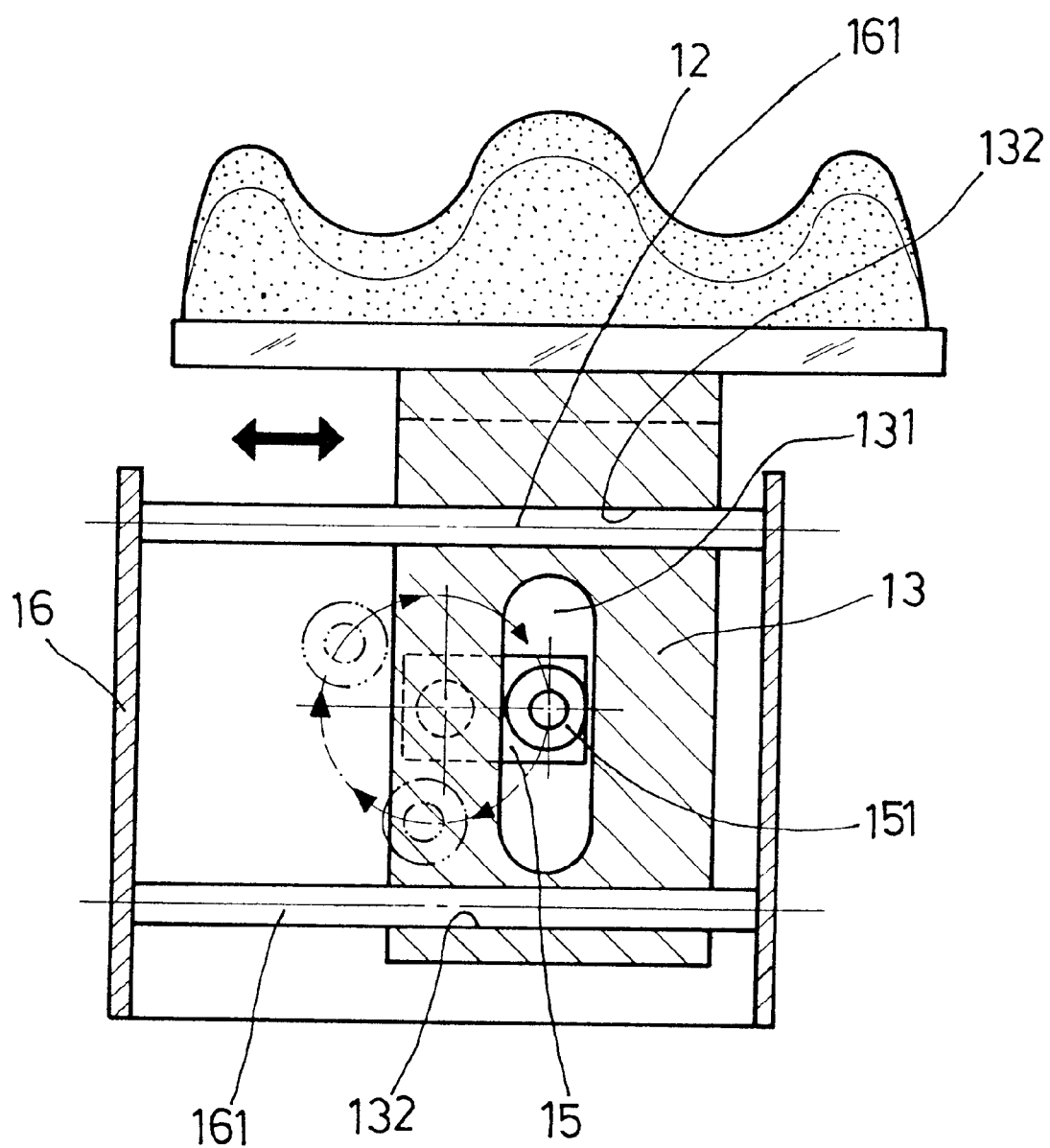
FIG. 3 is a schematic drawing of a drive unit of the conventional foot massage machine.
Figure 4:
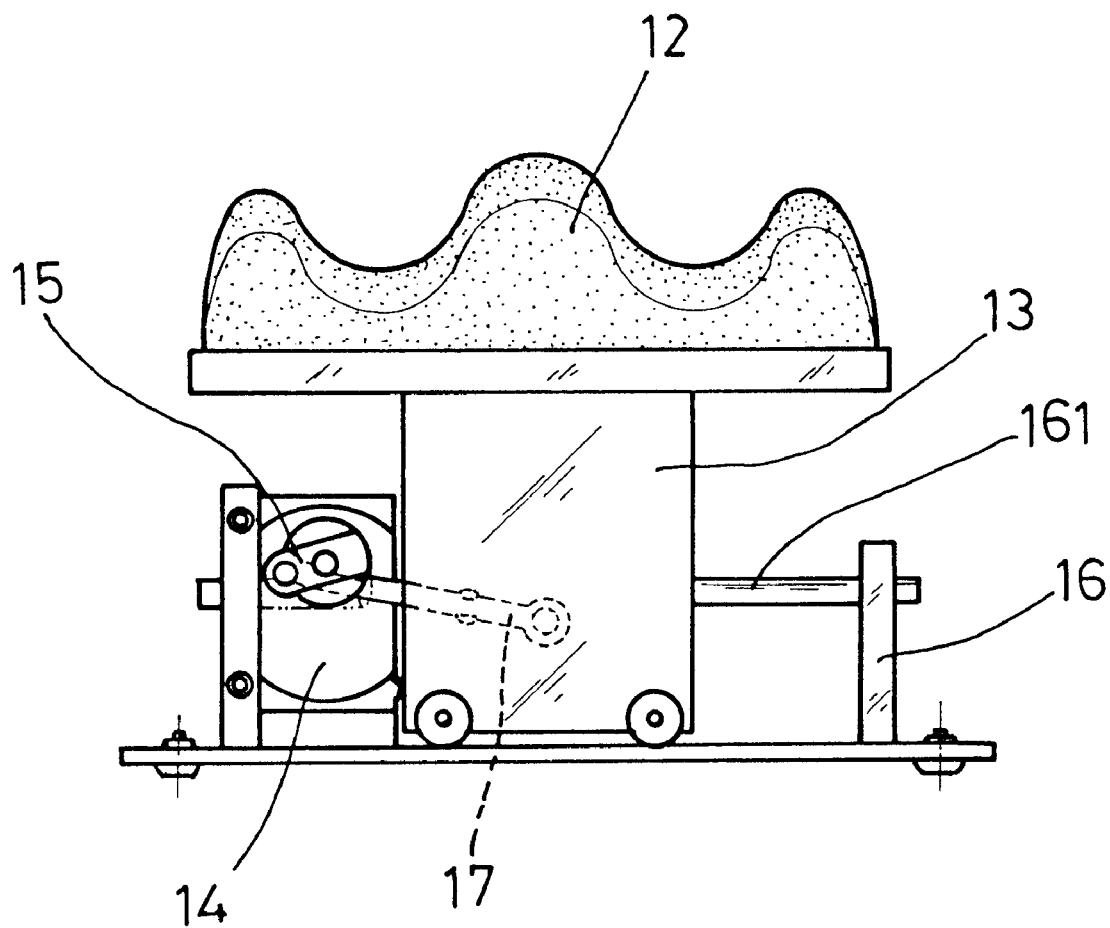
FIG. 4 is another schematic drawing of a drive unit of the conventional foot massage machine.
Figure 5:
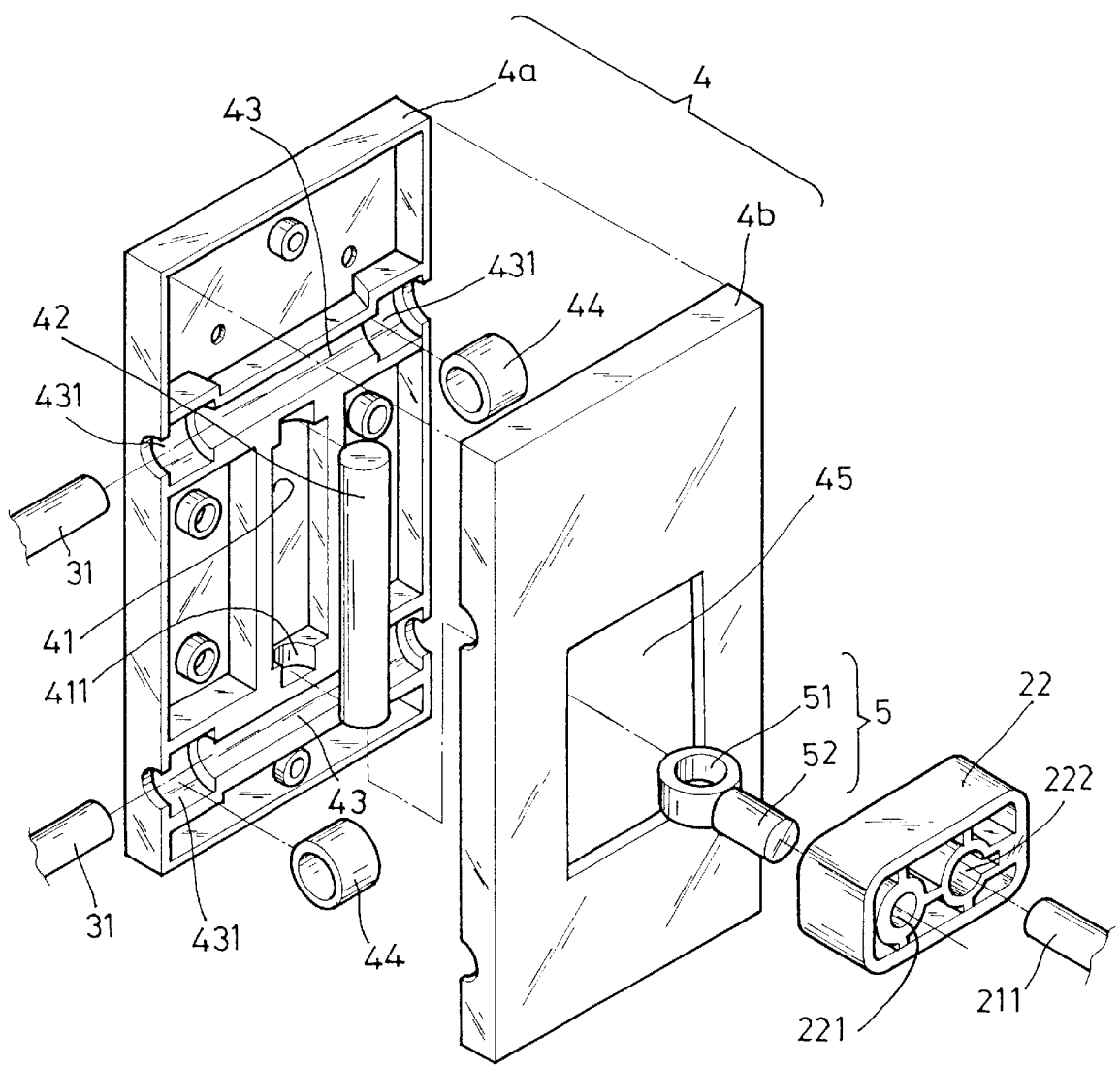
FIG. 5 is a perspective exploded view of a drive unit of an applicable embodiment of the present invention.
Figure 6:
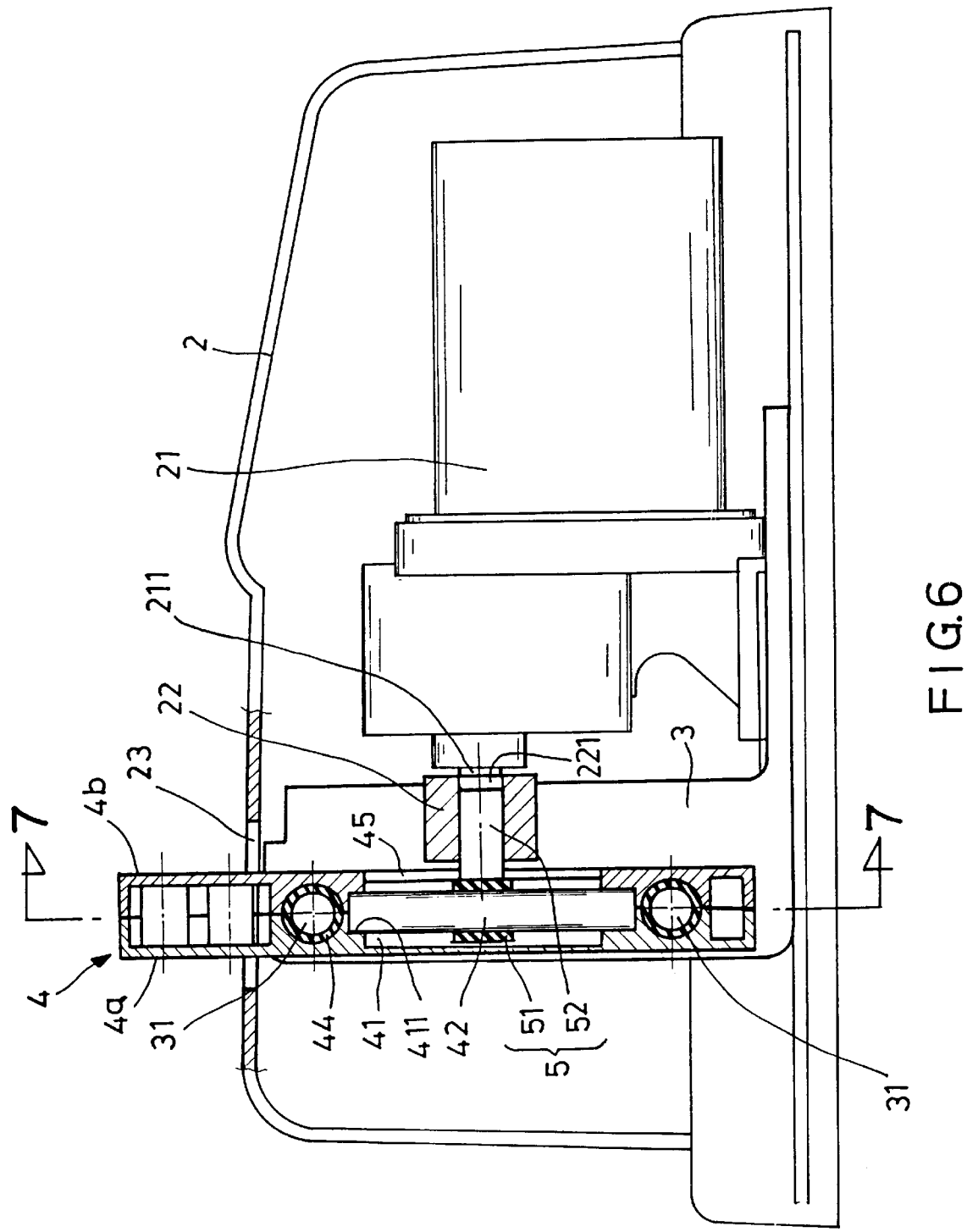
FIG. 6 is a side view of the drive unit of the applicable embodiment of the present invention.
Figure 7:
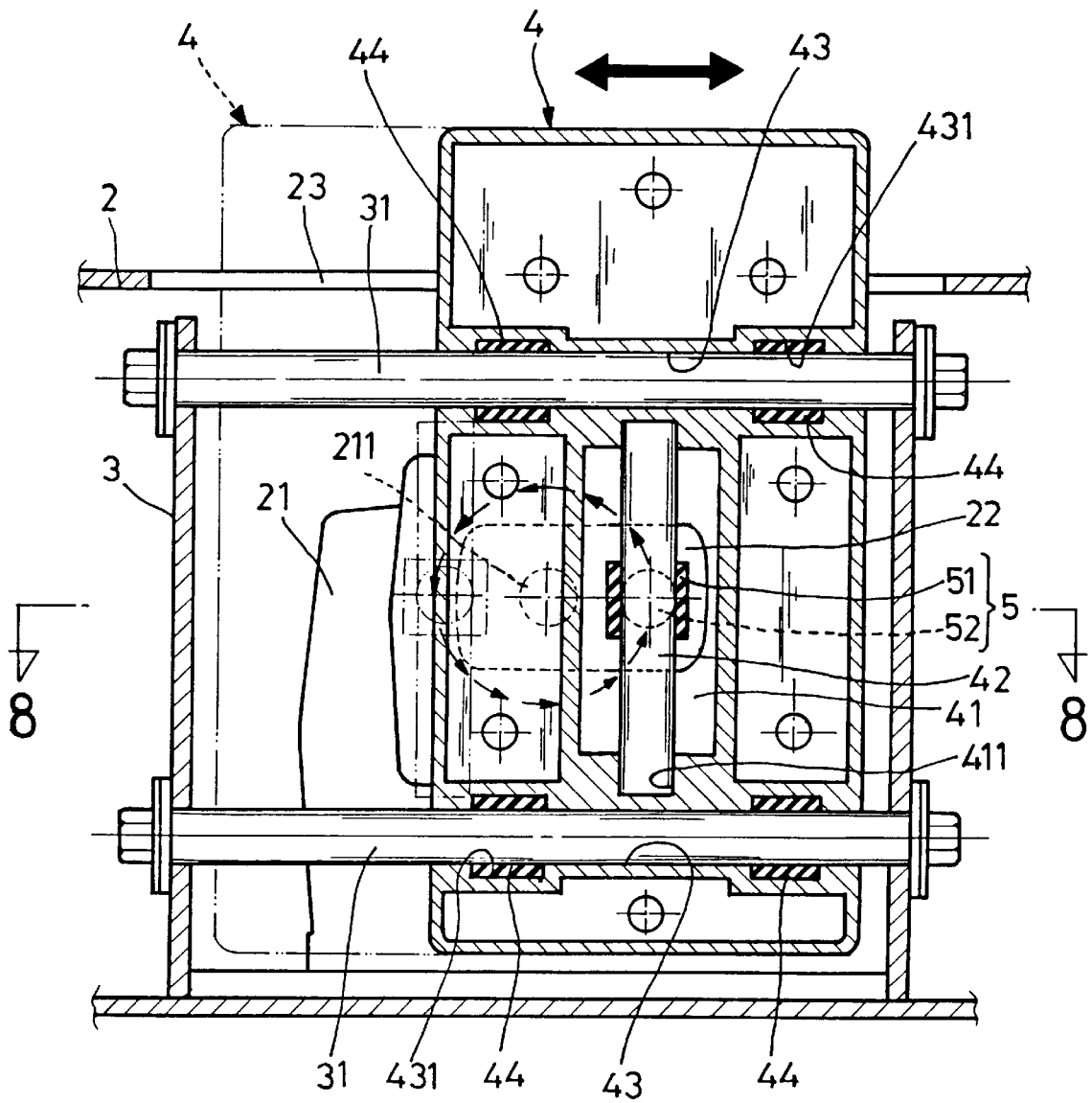
FIG. 7 is a sectional view taken along the line A—A of FIG. 6.
Figure 8:
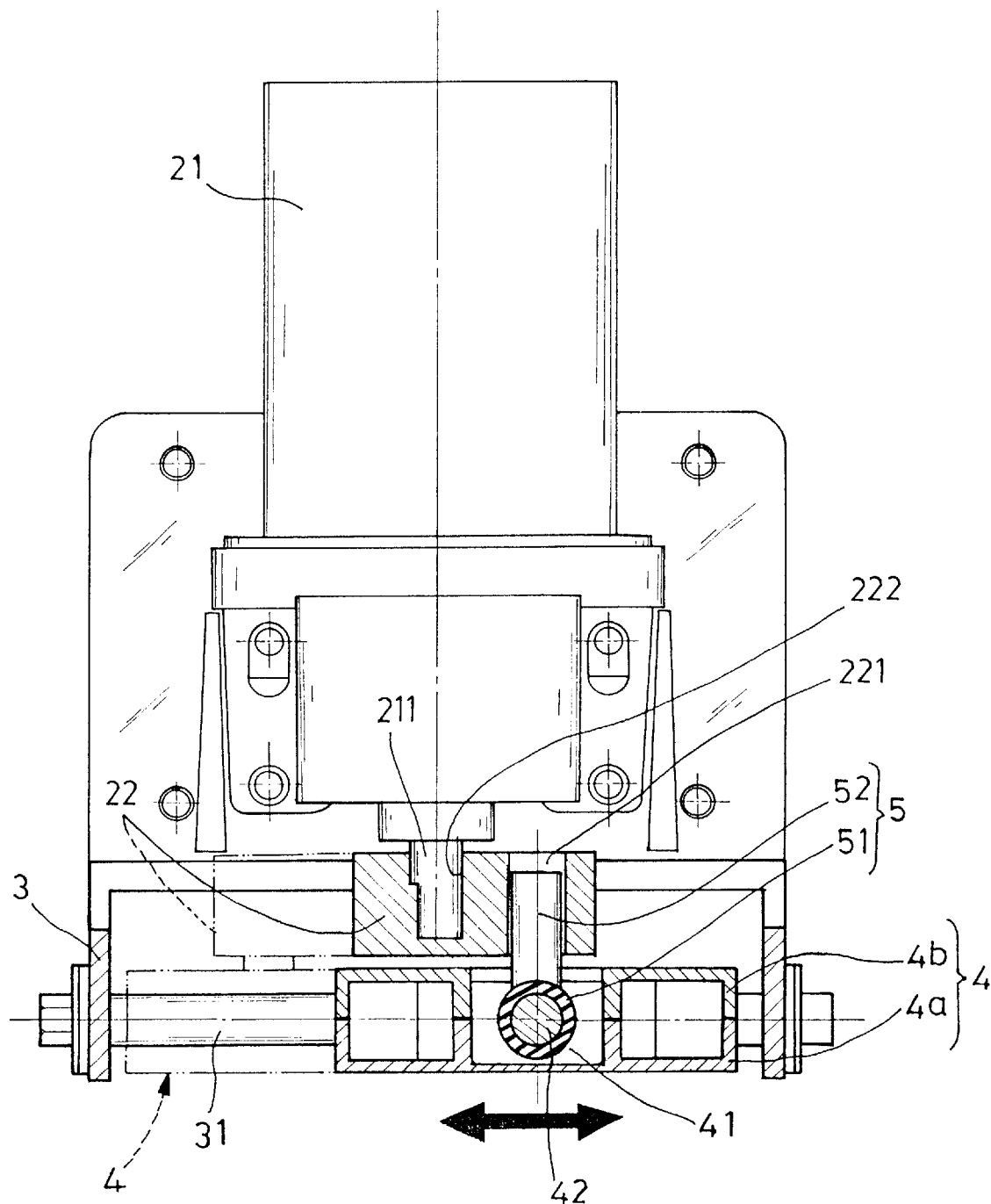
FIG. 8 is a sectional view taken along the line B—B of FIG. 7.

First of all, referring to FIGS. 6 through 8, the present invention includes:

a housing 2 having a motor 21 inside thereof, an eccentric block 22 being driven by a power output shaft 211 of the motor 21 and a laterally elongated groove 23;

a frame 3 disposed in front of the motor 21 and situated inside of the housing 2, two shaft rods 31 being parallel to each other at top and bottom thereof; and a slider assembly 4 mounted on two shaft rods 31 and driven by means that the motor 21 brings the eccentric block 22 in motion such that the slider assembly 4 is shiftable leftward and rightward between two shaft rods 31 of the frame 3, the slider assembly 4 extending through the laterally elongated groove 23, a massage seat (not shown) on which a foot rests being mounted thereon.

The present invention is characterized in that the slider assembly 4 is provided with a longitudinal bar 42 at center thereof for connecting with a crank 5, and that the crank 5 is T-shaped and includes a circular sleeve 51 externally mounted on the longitudinal bar 42 and a cylindrical slider 52 serving as shaft and fixed at one side of the circular sleeve 51, and that the cylindrical slider 52 is inserted into a mounting hole 221 of the eccentric block 22, showing a sliding joint between a shaft and the mounting hole 221, and that when the eccentric block 22 rotates with the power output shaft 211, the crank 5 acts as a driven part and the circular sleeve 51 moves upward and downward in the longitudinal bar 42, and that the driven slider assembly 4 laterally shifts leftward and rightward on two shaft rods 31 by means of the principle of the eccentric drive.

The above-mentioned slider assembly 4 can be formed in one body or composed of two pieces. However, a longitudinal bar 42 has to be fixed at center thereof and serves as shaft center of the driven part. Accordingly, the crank 5 may make use of the crank drive principle to bring the slider assembly 4 in leftward and rightward movement.

An applicable embodiment of the slider assembly 4 of the present invention is composed of a front plate 4a and a rear plate 4b. A longitudinal groove 41 is formed at center of the opposite inner face while the top and the bottom thereof are provided with a semicircular groove 411 with smaller radius for locking the top and the bottom of the metallic bar 42 to be located between the front plate 4a and the rear plate 4b. Moreover, two lateral semicircular groove 43 parallel to each other are respectively formed at the top and the bottom of the longitudinal groove 41. Meanwhile, the right and the left ends of the lateral semicircular groove 43 are fitted with a locking groove 431 of greater radius for receiving a shaft sleeve 44 and for fixing between the front plate 4a and the rear plate 4b. Furthermore, the rear plate 4b includes a hollow groove 45 opposite to the longitudinal groove 41 in order that the front end of the T-shaped crank 5 extends into the slider assembly 4.

Another applicable embodiment of the slider assembly 4 of the present invention, as shown in FIG. 9, consists of an upper and a lower slide block 4c, 4d while a round bar 42 is fixed at center thereof. The front plate 4a and the rear plate 4b can be synchronically shifted leftward and rightward on two shaft rods 31. The application principle is the same to that of the above-mentioned slider assembly, making use of the eccentric drive principle of the T-shaped crank 5 which moves upward and downward to bring the slider assembly 4 into leftward and rightward motion.

The operation of the drive unit of the present invention is shown in FIGS. 6 through 8. When the power output shaft 211 of the motor 21 brings the eccentric block 22 into rotation, the mounting hole 221 will bring the T-shaped crank 5 into revolution at 360° on the power output shaft 211. The circular sleeve 51 of the T-shaped crank 5 is mounted on the outer rim of the longitudinal bar 42 and the cylindrical slider 52 of the T-shaped crank 5 is inserted into the mounting hole 221 of the eccentric block 22 so that a rotation state on its own axis is created. Besides, the T-shaped crank 5 revolves on the power output shaft 211. Accordingly, the circular sleeve 51 moves upward and downward on the round bar 42. Thereafter, the round bar 42 moves leftward and rightward by means of the push force of the T-shaped crank 5 when rotating. As a result, the slider assembly 4 laterally shifts rightward and leftward on two shaft rods 31.

Accordingly, the drive unit of the present invention, in comparison with the conventional one, includes the following effects:

1. The longitudinal bar 42 of the present invention is clamped between the front plate 4a and the rear plate 4b or the upper or between the lower slide blocks 4c, 4d. The circular sleeve 51 of the T-shaped crank 5 and the round bar 42 are precisely connected, and almost no clearance between them is present. As a result, when the circular sleeve 51 longitudinally shifts on the round bar 42, almost no noise is created so that it's quiet and labor-saving.

2. The slider assembly 4 laterally shifts on two shaft rods 31, as shown in FIG. 7. The four edges of the front plate 4a and the rear plate 4b are respectively covered with a shaft sleeve 44 which can be made from bearing, metallic socket or even wear-resisting material, like ABS. Accordingly, a precise connection of the slider assembly 4 on the shaft rods 31 and the sliding shift without clearance are achieved. As a result, a smooth sliding, an excellent wear-resistance, a long service life and a low noise are attainable.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A drive unit of a foot massage machine comprising:

a housing having a motor inside thereof, an eccentric block being driven by a power output shaft of said motor and a laterally elongated groove;

a frame disposed in front of said motor and situated inside of said housing, two shaft rods being parallel to each other at top and bottom thereof; and a slider assembly mounted on two shaft rods and driven by means that said motor brings said eccentric block in motion such that said slider assembly is shiftable leftward and rightward between two shaft rods of said frame, said slider assembly extending through said laterally elongated groove, a massage seat on which a foot rests being mounted thereon;

characterized in that said slider assembly is provided with a longitudinal bar at center thereof, and that a crank is inserted on the outer rim of said longitudinal bar, and that said crank is T-shaped and includes a circular sleeve externally mounted on said longitudinal bar and a cylindrical slider serving as shaft and fixed at one side of said circular sleeve, and that said cylindrical slider is inserted into a mounting hole of said eccentric block, showing a sliding joint between a shaft and said mounting hole, and that when said eccentric block rotates with said power output shaft, said crank acts as a driven part and said circular sleeve moves upward and downward in said longitudinal bar, and that said driven slider assembly laterally shifts leftward and rightward on two shaft rods by means of the principle of the eccentric drive.

* * * * *